P. P. FENAUX.
CUTTING ATTACHMENT FOR LATHES.
APPLICATION FILED JULY 12, 1916.
1,260,172.
Patented Mar. 19, 1918.
2 SHEETS—SHEET 1.
Fig. 1.
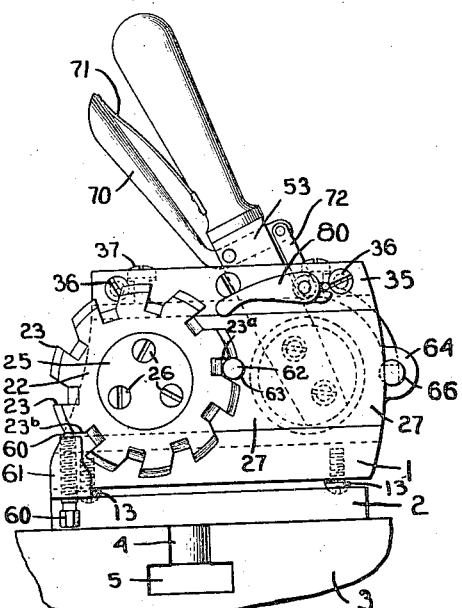
Fig. 2.
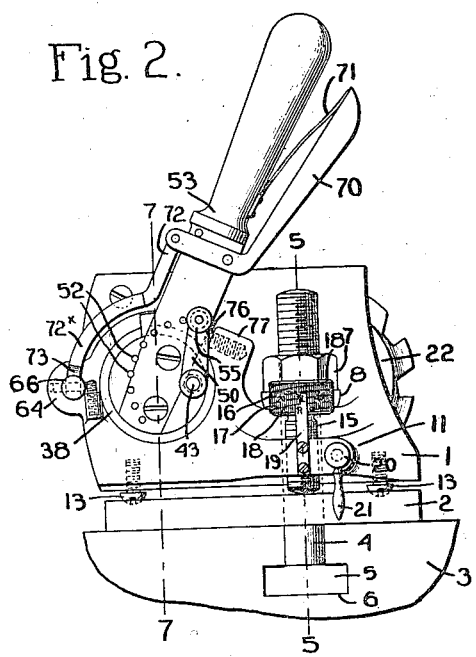
Fig 3.
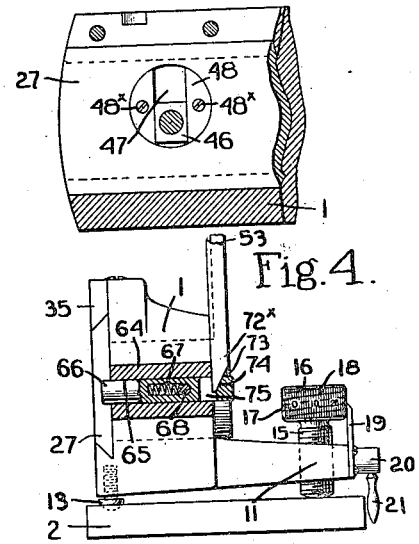
Fig. 4.
Inventor.
Pierre P. Fenaux
by Heard Smith & Tennant.
Attys.

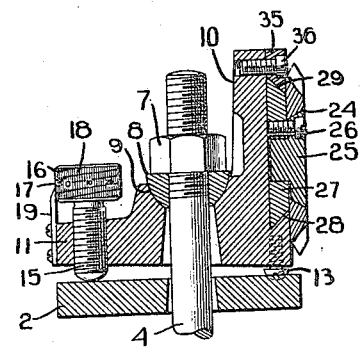
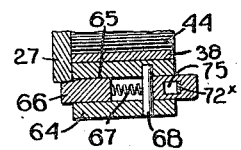
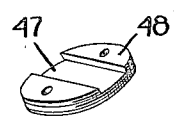
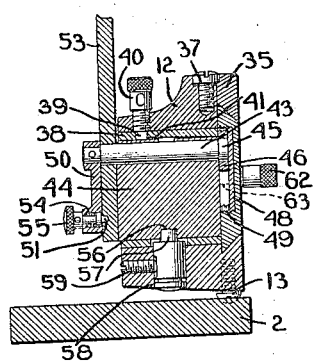

UNITED STATES PATENT OFFICE.

PIERRE P. FENAUX, OF NEWTONVILLE, MASSACHUSETTS, ASSIGNOR TO RIVETT LATHE & GRINDER COMPANY, OF BRIGHTON, MASSACHUSETTS, A CORPORATION OF MASSACHUSETTS.

CUTTING ATTACHMENT FOR LATHES.

1,260,172.  Specification of Letters Patent.  Patented Mar. 19, 1918.

Application filed July 12, 1916. Serial No. 108,944.

*To all whom it may concern:*

Be it known that I, PIERRE P. FENAUX, a citizen of France, and resident of Newtonville, county of Middlesex, State of Massachusetts, have invented an Improvement in Cutting Attachments for Lathes, of which the following description, in connection with the accompanying drawing, is a specification, like characters on the drawing representing like parts.

This invention relates to improvements in cutting tools for metal working apparatus and particularly to tools for cutting right and left hand screw threads in which means are provided for the successive engagement of a series of cutters on a rotatable disk with the work being screw threaded, means also being provided for tipping the holder which supports the cutter to such angle as to give the desired pitch to the screw threads.

More specifically the invention relates to certain improvements upon the type of screw thread cutter illustrated in Patents No. 632,678 Dock and No. 652,643 Rivett and comprises certain modifications of the structures shown in these patents adapted to simplify the construction of the tool to insure its accuracy of adjustment and to provide means for taking up any wear which may be occasioned by long usage.

The drawings illustrate the tool embodying my invention with a sufficient portion of the lathe tool slide to show the means by which the tool is secured to it.

In the drawings;

Figure 1 is a side elevation of a screw cutting tool embodying my invention, showing the cutting tool and its supporting slide, Fig. 2 is an elevation of the opposite side showing the tool slide actuating lever and the means for adjusting the inclination of the stand, Fig. 3 is a detail view of the slide showing the cross-head and guideway through which the slide is advanced and retracted, Fig. 4 is a rear end view showing the slide locking mechanism partly in section, Fig. 5 is a vertical sectional view on line 5—5, Fig. 2, Fig. 6 is a detail sectional view of the slide locking mechanism, Fig. 7 is a vertical sectional view on line 7—7 of Fig. 2, and, Fig. 8 is a detail view of the cylindrical member providing a guideway for the slide actuating cross-head.

As illustrated herein the tool comprises a stand or holder 1 adapted to be carried by a support 2 which rests upon the usual tool slide 3 of the lathe. The holder and support are secured to the slide by a bolt 4, the head 5 of which rests in an undercut groove 6 in the slide 3. The stem of the bolt extends through the support 2 and the holder or stand 1 and is secured thereupon by a nut 7 resting upon a washer 8 having a hemispherical face engaging a corresponding socket 9 in the holder 1. The holder 1 of the tool comprises an integral upwardly extending tool supporting portion 10 and a lateral extension or foot 11 also a laterally extending boss 12 adapted to form a journal for the hub of the handle which actuates the tool carrying slide as will hereinafter be fully described. The lower edge of the vertical portion 10 of the holder 1 may be provided with a rib extending the full length of the holder as in Patent No. 652,643 or may be supported upon hardened steel screws 13 having convex ends adapted to rest upon the support 2 to afford a pivotal bearing about which the holder may be tilted by a screw 15 extending through the extension or foot 11 near its outer end. The extension or foot 11 is so disposed in relation to the vertical portion 10 of the holder that when the outer face of the stand is in a vertical position the foot 11 will be raised at a distance from the outer surface of the support 2 so that by adjusting the screw 15 up or down the plane of the teeth of the cutter may be varied to change the direction of the thread and to enable it to cut a right or left hand thread or groove of any desired pitch.

In the construction illustrated in the patents above referred to the tipping screw 15 was provided at its upper end with a slot to receive the end of a screw driver by which the screw could be rotated to tip the body portion or stand. Heretofore the amount of such tipping required for any particular screw thread had to be determined by measurement or by experiment. In the present device I have provided means whereby the amount of tilting or tipping of the stand may be accurately determined and the tool set properly for any desired pitch without the necessity of measuring the angle of inclination. This is accomplished by providing a screw 15 with a cylindrical head 16 having circumferential circular grooves or marks 17 thereon or preferably spiral grooves or marks corresponding in pitch to that of the screw 15; and coördinate vertical grooves or marks 18 preferably 100 in number, both of said sets of grooves or marks being adapted to coöperate with a finger 19 rigidly secured to the end of the extension or foot 11 and preferably having its end provided with indexes adapted to coöperate with the scale on the head 16 to indicate the proper adjustment of said head to cut either right or left hand threads of any predetermined pitch.

By this construction any desired tilting of the stand to correspond to the requirement of pitch of a left or right hand screw may be accurately determined from a chart indicating how many spirals and one-one-hundredths of a spiral are necessary to turn the head 16 of the screw 15 from its central or normal position to give the proper inclination to the tool. When the proper adjustment has once been effected the screw 15 may be retained from further rotation by a clamping screw 20 extending across a slot leading through the side of the foot 11 to the aperture for the screw 15 therein, said clamping screw being operable by a suitable handle 21.

The cutting tool is in the form of a disk 22 having a series of peripheral cutters 23 of progressively increasing length and differing profiles. The disk 20 is provided with a preferably conoidal recess 24 to receive the conoidal head of a hub 25 having an extension entering and secured by screws 26 to a tool carrying slide 27.

The tool carrying slide is provided with beveled edges 28, 29 seated in correspondingly beveled ways in the vertical portion 10 of the stand 1.

In the construction illustrated in Patent No. 652,643 the guideway for the tool carrying slide was provided with a gib co-acting with one edge of the slide and adjustable by suitable screws to take up wear. The present invention comprises an improved construction in which the lower beveled face 28 of the tool carrying slide engages the corresponding face of a way in the stand 1 and the upper beveled face 29 of said slide is engaged by a corresponding face on a member 35 which preferably extends the full length of the upward extension 10 of said holder. The member 35 is adjustably secured to the upper portion 10 of the stand by transverse bolts 36 seated in slightly larger apertures in said member 35 than the diameter of the screw and by vertical adjusting screws 37 the heads of which overlie shoulders in the upper portion of said member 35. (See Fig. 7.) By this construction the member 35 which provides the upper guide way for the tool carrying slide may be accurately adjusted throughout either the whole or a portion of its length so as to coöperate accurately with the beveled face 29 of the tool carrying slide and thereby maintain the same and the tool which it supports in proper position at all times.

The tool carrier 27 in the present device as in the structure illustrated in Patent No. 652,643 is advanced and retracted by an actuator comprising a lever extending eccentrically from said hub into a cross head vertically reciprocable in the tool carrying slide.

In the construction illustrated in the patent aforesaid the hub of the handle is made to fit tightly the socket in the stand and the stud projecting therefrom enters a cross head slidably mounted in vertical ways formed between two segments which are secured in a cylindrical recess in the inner face of the slide. In that construction no means is provided for lubricating the moving parts.

In the present construction the hub of the handle is retained within a bushing seated in a socket in the base and so constructed that oil may readily be supplied to the moving parts. A simplified construction is also provided by which the cross-head which is engaged by the stud upon the hub is seated in a suitable guideway in an integral member which preferably is screwed into a recess in the slide, the integral member being locked against rotation when in proper position.

As illustrated herein a cylindrical bushing 38 is detachably secured within the socket in the boss 12. The bushing 38 is provided with an aperture connecting with an oil cup 40 seated in the upper portion of the boss 12 and a duct 41 leads from said aperture to an annular groove 42 in the hub 44 which receives a locking pin to secure the hub in place as will hereinafter appear. The groove 42 traverses the bearing of the stud 43 which is eccentrically mounted in the hub 44 and thereby serves to supply oil to the bearing of said stud and through it also to the cross head in the tool slide.

The end 45 of the stud 43 is eccentric to the axis of the stud and engages the cross head 46 which is seated in the way 47 in the tool carrying slide, as in the construction shown in Patent No. 652,643 aforesaid.

In that construction the way for the cross-head was formed by the parallel edges of two segmental pieces which were spaced apart and riveted in a cylindrical recess in the inner face of the tool carrying slide.

In the present improved construction the way 47 is formed by a transverse slot cut diametrically in the face of a cylindrical disk 47 which preferably has a screw threaded periphery adapted to engage complementary threads upon the annular wall of the recess in the tool carrying slide 27 or which, if desired may have a smooth periphery. By thus constructing the guideway 47 in an integral disk instead of providing two segments independently secured to the slide as in the old device, a more rigid construction is provided which can be more easily made and the guideway more accurately located. The disk 48 may be secured in place in the tool carrying slide by screws 48× so that there can be no possible variation in the position of the guideway 47 and all tendency to bind due to displacement in riveting, is avoided. The opposite end of the stud 43 is provided with an arm 50 having at its end a detent 51 adapted to enter any one of a series of holes 52 on the exterior surface of the handle 53. The detent normally is forced inwardly by a spring 54 and may be retracted by a milled head 55.

The hub 44 is secured in place by the reduced end 56 of a stud 57 which enters the annular groove 42, the stud 57 being detachably inserted in an aperture 58 through the bottom portion of the stand 1 and secured therein by a suitable set screw 59.

It will be obvious that in the operation of the device the movement of the handle 53 forward and backward will cause the advancement of the tool carrier and consequently the cutter toward and from the work. By reason of the fact that the stud 44 is provided with an eccentric end 45 which engages the cross head 46 in the way 47 in said tool carrier, the cutting position of the tool may be accurately adjusted by placing the detent 51 in the proper aperture.

When the tool is in cutting position the heel of the work engaging cutter is supported upon the end of a screw 60 which projects upwardly through a boss or bracket 61 on the holder. When the device is in operative position the cutting edge of the tool desirably is located beneath the horizontal plane of the axis of the rotatable cutter 22 but eccentrically in the horizontal plane of the rotating work.

In the constructions heretofore made this positioning of the cutter has been accomplished by measurement and experiment. In the present device I have provided means whereby the proper position of the cutter may be determined almost instantly. This comprises a stop pin 62 removably seated in an aperture 63 in the tool carrying slide 27 within the circumference of the periphery of the teeth 23 of the cutting disk. This aperture is so positioned that when the cutting face 23 of any tooth engages the side of the pin the cutting face 25 of a complementary tooth will be precisely in cutting position so that in adjusting the cutter it is merely necessary to insert the stop pin 62 in the aperture 63 and turn the cutting disk until the forward face of a tooth is in engagement with it, whereupon the complementary work engaging tooth may be retained in exact position by screwing up the adjusting screw 60 until it rests firmly against the heel 23$^b$ of said active tooth. When this adjustment has been once made the stop pin may be removed during the operation of the cutting tool.

It is found that when a cutting tool of the character disclosed herein has been in operation for a considerable time there is necessarily a certain amount of wear upon the parts which permits the tool carrying slide 27 to be thrust backwardly very slightly, but a sufficient distance to impair the absolute accuracy of the cutter. I have therefore devised means for positively locking the tool in work engaging position. This locking means preferably comprises a locking bolt adapted to be projected into engagement with the end of the slide 27 while the tool is in cutting position and which may be retracted from locking position as the lever 53 is actuated to withdraw the tool carrying slide and the tool from its work and to advance the same another tooth.

In the preferred embodiment of the invention illustrated herein the rear end of the vertical portion 10 of the stand is provided with a boss 64 which has a cylindrical aperture 65 forming the guideway for a bolt 66 normally extended, to engage the end of the slide 27, by a spring 67 seated in an aperture in said bolt and bearing at one end against the bolt and at the other end against a pin 68 traversing said aperture.

Any suitable means may be utilized for withdrawing the bolt to permit the slide to be retracted successively to advance a new tooth to cutting position. A preferred mechanism is illustrated herein which comprises an L-shaped lever 70 pivotally mounted upon the handle 53 and normally retained in extended position by a spring 71, the opposite end of the lever being connected to a preferably curved link 72 having a tapered end 73 adapted to engage a beveled wall 74 of an aperture 75 in said bolt 66. The lower portion 72× of the link 72 preferably is of a cross section equal and corresponding to the cross section of the aperture 75 so that as the lever 53 is drawn backwardly the beveled portion 73 at its end will first cause the retraction of the bolt 66 by its engagement of the beveled portion 74 on said bolt and the curved portion 72× of the lever 72 entering the aperture 75 in the bolt will retain the bolt out of locking position while the lever 53 is being manipulated.

The extent of the movement of the lever 53 preferably is adjustably limited in one direction by a suitable screw 76 seated in a shouldered extension 77 on the boss 12 and in the other direction by a screw 78 seated in a similar boss 79.

The operation of the device disclosed herein is substantially the same as that set forth in Patent No. 652,643. The tool is illustrated in Fig. 1 as in cutting position with the stop pin 62 positioning the edge of a cutter. At this time the set screw 60 is advanced until it engages the heel of the cutter which is positioned to engage the work. At this time also the bolt 66 is advanced by the spring 67 so as to lock the tool carrier 27 against rearward movement during the operation of the cutter. After this cutter has finished its work the handle is grasped, the lever 70 first being pressed toward the handle 53 to withdraw the bolt 66, thereafter the lever 53 is rocked backwardly withdrawing the slide 27 and retracting the cutter from work engaging position, also removing it from the screw 60. As the slide is being drawn backwardly the pawl 80 engages one of the cutting teeth and rotates the cutter so that the next succeeding tooth is placed in cutting position. The lever 53 is then advanced until the new cutter rests upon the end of the screw 60 whereupon the lever 70 is released and the bolt 66 again pressed into locking position.

When it is desired to change the pitch of the screw the stand is tilted to the proper position by rotating the head 16 of the screw 15 until the end of the index 19 registers with the spiral and vertical marks required to give the proper pitch of the screw which may conveniently be indicated upon a chart plotted for that purpose. By this means of adjustment a much greater accuracy is attained than in the old form of tool and the adjustment may be made much more quickly. By reason of the other details of construction heretofore pointed out the accuracy of the tool is improved and its life prolonged.

It is to be understood that the construction disclosed herein is a preferred embodiment of the invention but that various changes in construction and the substitution of equivalents may be made within the meaning and scope of the following claims.

Having thus described my invention what I claim as new and desire to secure Letters Patent is:

1. In a device of the class described comprising a holder having a tool carrying member and means for moving the same toward and from the work, means for tilting said holder to position the tool for cutting screw threads comprising an adjustable screw having a graduated head and an indicator having means coöperating with the graduations upon said head and adapted to indicate the positions of adjustment of the tool required for cutting screw threads of different predetermined pitch.

2. In a device of the class described comprising a holder having a tool carrying slide and means for moving the same toward and from the work, means for tilting said holder comprising an adjusting screw having a head provided with circumferential and coördinating graduations and a stationary finger having indexes coöperating with said graduations whereby the holder may be adjusted readily to position the tool to cut right or left hand screw threads of different predetermined pitch.

3. In a device of the class described comprising a holder having a tool carrying slide and means for moving the same toward and from the work, means for tilting said holder comprising an adjusting screw having a head provided with spiral graduations corresponding to the pitch of the thread of said adjusting screw and coördinating graduations and a stationary finger having indexes coöperating with said graduations whereby the holder may be adjusted readily to position the tool to cut right or left hand screw threads of different predetermined pitch, and means for clamping the adjusting screw against movement when the holder has been properly positioned.

4. In a device of the class described comprising a holder, a tool carrying slide, a guideway in said holder for said slide comprising an undercut member adapted coöperatively to engage a beveled face on said slide and means for adjustably securing said member to said holder.

5. In a device of the class described comprising a holder, a tool carrying slide, a guideway in said holder for said slide, comprising an undercut member adapted coöperatively to engage the beveled face of said slide and means for adjustably securing said member to said holder consisting of a series of binding screws passing transversely through said member and engaging said holder and adjusting screws seated in said holder substantially at right angles to said binding screws and having heads overlying said member.

6. In a device of the class described, a holder, a tool carrying slide having a cylindrical recess mounted in said holder, a diametrically slotted disk removably seated in said recess, and an actuator having means operatively engaging the slide in said disk whereby movement of said actuator will cause the advancement or retraction of said tool carrying slide.

7. In a device of the class described, a holder, a tool carrying slide having a cylindrical recess mounted in said holder, a diametrically slotted disk having a screw threaded periphery engaging complementary screw threads in the walls of said recess, means for securing said disk in said recess against rotary movement and an actuator having means operatively engaging the slide in said disk whereby movement of the actuator will cause advancement or retraction of said slide.

8. In a device of the class described, a holder, a tool carrying slide having a cylindrical recess mounted in said holder, an integral cylindrical disk having a transverse slot providing a way removably secured in said recess by screws, a cross head reciprocably mounted in said way, and a rotatable actuator having means engaging said cross head whereby rotary movement of said actuator will cause longitudinal reciprocation of said cross head.

9. In a device of the class described comprising a holder and tool carrier slidably mounted thereon, a rotatable tool having a series of cutters mounted upon said carrier, an actuator for reciprocating said carrier and means operable by reciprocation of said carrier to rotate successively said cutters to cutting position, an adjustable support for the active cutter and means for positioning an active cutter in cutting position whereby the adjustable support may be set properly to support the cutters as they are successively brought into cutting position.

10. In a device of the class described comprising a holder, a tool carrier slidably mounted thereon, a rotatable tool having a series of cutters mounted upon said carrier, an actuator for reciprocating said carrier and means operable upon the reciprocation of said carrier to rotate successively said cutters to cutting position, an adjustable support for the active cutter, and means for positioning the active cutter in proper relation to the work consisting of a pin removably seated in the socket of said cutter and adapted to be engaged by an active cutter when the active cutter is in cutting position, whereby the cutter support may be adjusted readily to the proper cutter supporting position.

11. In a device of the class described comprising a holder and a tool carrying slide mounted therein, a rotatable tool having a series of cutters mounted upon said tool carrier and adapted successively to be placed in work engaging position, an adjustable support for the active cutting tool; means for locking said tool carrying slide with the tool in cutting position.

12. In a device of the class described comprising a holder and a tool carrying slide mounted therein, a rotatable tool having a series of cutters mounted upon said tool carrier and adapted successively to be placed in work engaging position, an adjustable support for the active cutting tool; means for locking said tool carrying slide with the tool in cutting position consisting of a bolt adapted to engage said slide when the tool is properly positioned.

13. In a device of the class described comprising a holder, a tool carrier slidably mounted therein, an actuator rotatably mounted in said holder and having means engaging said slide adapted to advance and retract the same, a tool having a series of cutters rotatably mounted upon said slide, means for supporting the active cutter in proper position, a bolt adapted to engage said slide and retain the same from movement when the cutter is in proper position and means upon said actuator for releasing said bolt when the cutter is to be withdrawn from cutting position.

14. In a device of the class described comprising a holder, a tool carrier slidably mounted therein, an actuator rotatably mounted in said holder and having means engaging said slide adapted to advance and retract the same, a tool having a series of cutters rotatably mounted upon said slide, means for supporting the active cutter in proper position, a spring actuated bolt mounted in said holder transversely of said slide adapted to engage said slide when the tool is in cutting position and means carried by said holder for retracting the locking bolt when the tool is to be removed from cutting position.

15. In a device of the class described comprising a holder, a tool carrying slide mounted therein, a tool having a series of cutters rotatably mounted upon said slide, means for supporting the active cutter in proper position, an actuator for advancing and retracting said slide consisting of a handle having a hub provided with a stud operatively engaging said slide, means for locking said slide when the cutter is in work engaging position comprising a bolt slidably mounted in said holder transversely of said slide and adapted to engage the latter and means for retracting said bolt when the slide is to be withdrawn from cutting position consisting of a member having a beveled end adapted to engage the walls of a recess in said bolt and means for actuating said member.

16. In a device of the class described comprising a holder, a tool carrying slide mounted therein, a tool having a series of cutters rotatably mounted upon said slide, means for supporting the active cutter in proper position, an actuator for advancing and retracting said slide consisting of a handle having a hub provided with a stud operatively engaging said slide, means for locking said slide when the cutter is in work engaging position comprising a bolt slidably mounted in said holder transversely of said slide and adapted to engage the latter and means for retracting said bolt when the slide is to be withdrawn from cutting position consisting of a member having a portion concentric to said stud terminating in a beveled end adapted to enter a recess in said bolt and a lever pivotally mounted upon said handle for actuating said member.

17. In a device of the class described a holder, a tool carrier mounted thereon, a support for said holder, means for clamping said holder upon said support, screws or pins presenting convex heads interposed between said holder and support and forming pivotal connections therebetween and means for tipping said holder upon said pivots whereby the cutter may be positioned to cut a thread or groove of any desired pitch.

18. In a device of the class described comprising a holder, a tool carrier slidably mounted thereon, an actuator rotatably mounted in said holder and having an eccentric engaging said slide to advance and retract the same, a handle for oscillating said actuator, means adjustably positioned in the path of said handle for limiting the movement thereof, a tool having a series of cutters rotatably mounted upon said slide, means for supporting the acting cutter in cutting position, a spring actuated bolt adapted to engage said slide and retain same from movement when the cutter is in cutting position and means carried by said actuator for releasing said bolt when the cutter is to be withdrawn from cutting position.

In testimony whereof, I have signed my name to this specification.

PIERRE P. FENAUX.

Copies of this patent may be obtained for five cents each, by addressing the "Commissioner of Patents, Washington, D. C."